United States Patent [19]

Hederich et al.

[11] 4,424,160

[45] Jan. 3, 1984

[54] PROCESS FOR THE PREPARATION OF 1-HYDROXY-4-AMINO-5(8)-NITROANTHRAQUINONE

[75] Inventors: Volker Hederich; Günter Gehrke, both of Cologne, Fed. Rep. of Germany

[73] Assignee: Bayer Aktiengesellschaft, Leverkusen, Fed. Rep. of Germany

[21] Appl. No.: 389,130

[22] Filed: Jun. 16, 1982

[30] Foreign Application Priority Data

Jul. 9, 1981 [DE] Fed. Rep. of Germany ....... 3127127

[51] Int. Cl.³ ............................................. C07C 97/26
[52] U.S. Cl. .................................................... 260/380
[58] Field of Search .......................................... 260/380

[56] References Cited

U.S. PATENT DOCUMENTS

| | | | |
|---|---|---|---|
| 2,189,012 | 2/1940 | Lord et al. | 260/380 |
| 2,653,954 | 9/1953 | Weinmayr | 260/380 |
| 3,060,200 | 10/1962 | Buecheler | 260/380 |
| 4,046,785 | 9/1977 | Hirai et al. | 260/380 |
| 4,048,199 | 9/1977 | Glser et al. | 260/380 |

FOREIGN PATENT DOCUMENTS

| | | | |
|---|---|---|---|
| 79768 | 2/1895 | Fed. Rep. of Germany | 260/380 |
| 96197 | 1/1898 | Fed. Rep. of Germany | 260/380 |
| 104282 | 1/1899 | Fed. Rep. of Germany | 260/380 |
| 105567 | 8/1899 | Fed. Rep. of Germany | 260/380 |
| 52-107077 | 8/1977 | Japan . | |
| 52-95744 | 11/1977 | Japan . | |

OTHER PUBLICATIONS

Barnett, Anthracene and Anthrapquinone, 1921, pp. 192–195, 222–225, 242–245 and 248–251, Von Nostrand Co., N.Y., N.Y.

Primary Examiner—Natalie Trousof
Assistant Examiner—Covington Raymond
Attorney, Agent, or Firm—Sprung, Horn, Kramer & Woods

[57] ABSTRACT

1-Hydroxy-4-amino-5- or -8-nitroanthraquinone is obtained in high yields and in high purity when 1,8-dinitroanthraquinone or 1,5-dinitroanthraquinone respectively is reacted below 80° C. in oleum in the presence of boric acid with reducing agents. The products of the process are valuable polyester dyestuffs as well as dyestuff intermediate products.

5 Claims, No Drawings

PROCESS FOR THE PREPARATION OF 1-HYDROXY-4-AMINO-5(8)-NITROANTHRAQUINONE

The present invention relates to a process for the preparation of 1-hydroxy-4-amino-5- or -8-nitroanthraquinone from 1,8-dinitroanthraquinone or 1,5-dinitroanthraquinone respectively or mixtures thereof.

It is already known from German Patent Specification 104,282 as well as from Japanese Preliminary Published Application No. 52/107,027 that α-dinitroanthraquinones are converted into hydroxynitrosonitroanthraquinones on treatment with fuming sulphuric acid. From German Patent Specification No. 96,197 as well as from Japanese Preliminary Published Applications 52/95,774 as well as 52/107,027 it is also known that dinitroanthraquinones are converted in sulphuric acid by means of reducing agents into dihydroxydiaminoanthraquinones. Furthermore, it is known (compare German Patent Specification No. 79,768) that dinitroanthraquionones and sulphuric acid produce hexahydroxyanthraquinone in the presence of boric acid. Finally, according to German Patent Specification No. 105,567 dinitroanthraquinones are converted by means of oleum and sulphur at 100° to 150° C.—if appropriate in the presence of boric acid—into hexahydroxy- or tetrahydroxydiaminoanthraquinonedisulphonic acids.

It has now been found that the title compounds are obtained in a simple manner by treating α-dinitroanthraquinones below 80° C. in $SO_3$-containing sulphuric acid in the presence of boric acid or its anhydride with reducing agents.

In view of the literature dealt with above this smooth course of reaction must be considered very surprising.

The content of free $SO_3$ in the fuming sulphuric acid which is to be used as the reaction medium according to the invention is 5 to 65%, preferably 20 to 40%.

Possible reducing agents are all those materials which in anthraquinone chemistry are customary for the reduction of nitro groups, such as, for example, iron, zinc, tin, aluminium, phosphorus, sulphur dioxide and preferably sulphur.

The preferred temperature range is between 30° and 60° C. The reaction times depend on the starting material employed, the reaction temperature, the concentration of the oleum and the nature of the reducing agent. In general, the reaction is complete after at most 10 hours, and the end of the reaction is recognised by the fact that α-dinitroanthraquinone is no longer detectable in the reaction mixture. In this reaction, the preferred starting material is 1,8-dinitroanthraquinone.

The amount of fuming sulphuric acid required to carry out the process according to the invention can vary within wide limits; the amount is preferably 5 to 10 times the amount by weight of the dinitroanthraquinone employed. The amount of boric acid is in general ¼ to ½ time the amount by weight of dinitroanthraquinone used. However, boric acid should be used in at least equivalent amounts. A relatively large excess does no harm. The reducing agents must also be used in at least the calculated quantity, but preferably in excess. In the case of sulphur, which is preferably to be used, 1 to 2 mols, and very particularly preferably 1.5 mols, of sulphur are required per mol of dinitroanthraquinone.

When carrying out the process according to the invention in practice, one advantageous procedure is to dissolve the dinitroanthraquinones in 5 to 10 times the amount by weight of 20 to 40% strength oleum. Thereafter an approximately 0.5-fold amount by weight of boric acid (relative to dinitroanthraquinone) is added, and at a temperature of 50° to 60° C. 1.5 mols or an approximately 0.15-fold amount by weight of sulphur are or is respectively added. The reaction is then completed, if necessary by further adding small amounts of sulphur. As an alternative to this process variant the dinitroanthraquinones can be added to a prepared solution of boric acid in fuming sulphuric acid and thereafter treated with sulphur as described above. The reaction mixtures are then diluted by the addition of dilute sulphuric acid and water to give 60 to 80% strength sulphuric acid. The reaction product then crystallises from this reaction mixture in a very pure form. According to another variant, the undiluted reaction mixture can be discharged onto ice water, whereupon the reaction product precipitates in a less pure form. The purification of this product can then be carried out in the customary manner. Finally, the title compounds can also be prepared in a less preferred process variant by treating the dinitroanthraquinones at 50° to 60° C. with oleum until dinitroanthraquinone can no longer be detected by chromatography. The reaction mixture is then diluted with water or with dilute sulphuric acid with cooling to such an extent that an approximately 60 to 80% strength sulphuric acid is formed. The mixture is then stirred at room temperature or at an elevated temperature (50° to 60° C.) for a few more hours, and during this period the $SO_2$ formed in a secondary reaction is allowed to act as a reducing agent. The resulting reaction product which precipitates is not sufficiently pure for some purposes and must therefore be purified in a customary manner (for example by recrystallising it from dimethylformamide).

In addition to pure 1,5- or 1,8-dinitroanthraquinone, mixtures thereof as obtained in the industrial dinitration of anthraquinone are also possible starting materials for all process variants.

Among the title compounds, the 5-nitro isomer is known (compare DE-OS (German Published Specification) No. 2,327,013). The two isomers are suitable for dyeing or printing synthetic fibres, in particular polyester fibres, by customary methods. In addition, they serve as intermediate products in the preparation of other valuable dyestuffs whereby the nitro group is reduced or replaced by an amine radical.

In the examples which follow parts denote parts by weight. The data on quality are based on quantitative thin-layer chromatography.

EXAMPLE 1

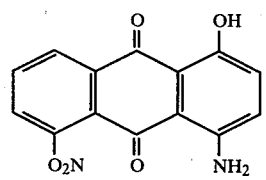

50 parts of crystalline boric acid are dissolved in 1,000 parts of 30% strength oleum. 100 parts of 1,8-dinitroanthraquinone (analysis: 97.6% of 1,8-DNA; 0.8% of 1,5-DNA) are then added at room temperature with stirring. 15 parts of pulverulent sulphur are then added in portions at a temperature of 50° C. in the course of 45 minutes. The reaction mixture is further stirred for 1 hour at 50° C., cooled down to room temperature and then diluted with cooling by means of 211 parts of 78% strength sulphuric acid and then with 525 parts of water. The precipitated reaction product is filtered off with suction and washed with 133 parts of 60% strength sulphuric acid and thereafter with warm water until neutral. 64.5 parts of 1-hydroxy-4-amino-5-nitroanthraquinone are obtained which after recrystallisation from N-methylpyrrolidone melts at 270° C.

EXAMPLE 2

100 parts of 1,8-dinitroanthraquinone are added to a reaction mixture prepared from 1,000 parts of 20% strength oleum and 25 parts of boric acid. 15 parts of sulphur are then added at room temperature in the course of 25 minutes, and the reaction mixture is warmed to 60° C. and maintained at this temperature with stirring for 4 hours. After cooling down, the reaction product is precipitated out by the dropwise addition of 158 parts of 78% strength sulphuric acid and 500 parts of water, in each case with cooling, and isolated as indicated in Example 1. 61.6 parts of 1-hydroxy-4-amino-5-nitroanthraquinone are obtained.

EXAMPLE 3

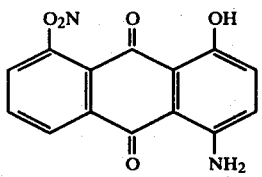

50 g of crystalline boric acid are dissolved in 1,000 parts of 35% strength oleum. 100 parts of 99.5% pure 1,5-dinitroanthraquinone are then added, and 15 g of sulphur are then added at 20° to 25° C. in the course of ½ hour. The reaction mixture is heated to 50° C. and stirred at this temperature for 1.5 to 2 hours. The reaction product is precipitated by the addition, with cooling, of 262 parts of 78% strength sulphuric acid and 574 parts of water. After the reaction product has been filtered off with suction, washed with dilute sulphuric acid and water and subsequently dried, 56.8 parts of a compound of the formula indicated are obtained, which compound, after recrystallisation from dimethylformamide, melts at 265°–267° C.

EXAMPLE 4

100 parts of 1,5-dinitroanthraquinone are reduced as indicated in Example 3 with 35% strength oleum in the presence of boric acid by means of sulphur. The batch is then discharged onto 4,000 parts of ice and the product is filtered off with suction. After washing until neutral, 98 parts of 1-hydroxy-4-amino-8-nitroanthraquinone are obtained in the form of a 38% strength presscake, which can be reduced, for example to give 1-hydroxy-4,8-diaminoanthraquinone.

EXAMPLE 5

50 parts of boric acid are dissolved in 556 parts of 20% strength oleum. 444 parts of 65% strength oleum are then added, and 100 parts of 1,5-dinitroanthraquinone are added to the resulting boron-oleum having an SO₃-content of about 29%. 17 parts of sulphur are added in the course of ½ hour and during this addition the temperature is allowed to rise to 50° C. After 1.5 hours' stirring at this temperature the reaction product is precipitated by the addition of 313 parts of 78% strength sulphuric acid and 570 parts of water. After the customary working-up, 51.4 parts of the compound indicated in Example 3 are obtained.

EXAMPLE 6

50 parts of 1,5-dinitroanthraquinone are heated in 500 parts of 30% strength oleum for 3 hours at 50° C. 25 parts of boric acid are then added with cooling in the course of 20 minutes, the resulting reaction mixture is then cooled down to 15° to 20° C. and 7 parts of sulphur are added to it. After 6 hours' further stirring at 15° to 20° C. the reaction mixture is worked up as indicated. 25.8 parts of 1-hydroxy-4-amino-8-nitroanthraquinone are obtained.

EXAMPLE 7

30 parts of 1,5-dinitroanthraquinone are stirred in 300 parts of 28% strength oleum for 4 hours at 50° to 60° C. 15 parts of boric acid are then added with cooling and dissolved. The reaction mixture is then diluted with 57.5 parts of 78% sulphuric acid and 156 parts of water, while cooling is continued, and stirred for 15 hours at room temperature. The reaction mixture is discharged onto 2,000 parts of ice, and the product is filtered off with suction and washed with warm water until neutral. After the product has been stirred with 500 parts of a 10% strength aqueous pyridine solution at 90° to 100° C., filtered off with suction and washed, 16 parts of 1-hydroxy-4-amino-8-nitroanthraquinone are obtained.

EXAMPLE 8

A mixture of 300 parts of 28% strength oleum and 30 parts of 1,5-dinitroanthraquinone are stirred for 3 hours at 50° to 60° C. After the addition of 85.5 parts of 78% strength sulphuric acid and 165 parts of water with cooling the reaction mixture is stirred for 6 hours at room temperature and then left to stand overnight. The mixture is added to 1,000 parts of water, and the product is filtered off with suction and washed with water until neutral. After drying, 23.3 parts of crude 1-hydroxy-4-amino-8-nitroanthraquinone are obtained, which can be purified by recrystallisation from dimethylformamide.

If the reaction is carried out analogously in 25% strength oleum, the reaction mixture is diluted after 4 hours' stirring at 60° C. by means of 78% strength sulphuric acid and water to give 70% strength sulphuric acid, stirring is continued for 4 hours at room temperature, the mixture is then left to stand overnight and finally heated for 6 hours at 100° C., 24.6 parts of crude 1-hydroxy-4-amino-8-nitroanthraquinone are obtained after the workingup described above.

EXAMPLE 9

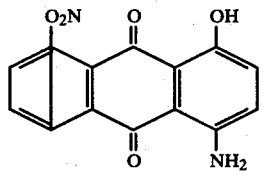

100 parts of a dinitroanthraquinone mixture containing 51% of 1,5-DNA and 42% of 1,8-DNA are treated in a solution of 50 parts of boric acid in 1,000 parts of 30% strength oleum with 18 parts of sulphur at 50° C. After 2 hours' stirring the reaction mixture is adjusted by the addition of 78% strength sulphuric acid and water to give a 60% strength sulphuric acid, and the product is filtered off with suction and worked up as usual. After drying, 49.3 parts of a product mixture are obtained which essentially consists of 1-hydroxy-4-amino-5- and -8-nitroanthraquinone.

If the entire reaction batch is discharged onto ice, 96 parts of a crude product are obtained which can be further processed, for example by reduction, to give a mixture of 1-hydroxy-4,5- and -4,8-diaminoanthraquinone.

We claim:

1. Process for the preparation of 1-hydroxy-4-amino-5- or -8-nitroanthraquinone, characterised in that 1,8-dinitroanthraquinone or 1,5-dinitroanthraquinone respectively or mixtures thereof are treated below 80° C. in $SO_3$-containing sulphuric acid in the presence of boric acid with reducing agents.

2. Process according to claim 1, characterised in that sulphur is used as the reducing agent.

3. Process according to claim 2, characterised in that the reaction is carried out at 30° to 60° C.

4. Process according to claim 1 characterised in that 1,8-dinitroanthraquinone is employed.

5. Process according to claim 1, characterised in that dinitroanthraquinone mixtures as obtained in the dinitration of anthraquinone are employed.

* * * * *